(12) United States Patent
Maharaj et al.

(10) Patent No.: US 9,789,396 B2
(45) Date of Patent: Oct. 17, 2017

(54) PORTABLE PLAY-SPACE FOR ENGAGING USERS

(71) Applicant: All Things Media, LLC, Mahwah, NJ (US)

(72) Inventors: Richard Louis Maharaj, Mahwah, NJ (US); Robert John Spierenburg, Mahwah, NJ (US)

(73) Assignee: ALL THINGS MEDIA, LLC, Mahwah, NJ (US)

( * ) Notice: Subject to any disclaimer, the term of this patent is extended or adjusted under 35 U.S.C. 154(b) by 65 days.

(21) Appl. No.: 14/692,814

(22) Filed: Apr. 22, 2015

(65) Prior Publication Data

US 2016/0310836 A1    Oct. 27, 2016

(51) Int. Cl.
| | |
|---|---|
| A63F 13/25 | (2014.01) |
| A63H 33/22 | (2006.01) |
| A63H 33/42 | (2006.01) |
| A63H 3/52 | (2006.01) |
| A63J 19/00 | (2006.01) |
| G03B 21/54 | (2006.01) |
| G03B 21/58 | (2014.01) |
| G03B 21/00 | (2006.01) |

(52) U.S. Cl.
CPC ............... *A63F 13/25* (2014.09); *A63H 3/52* (2013.01); *A63H 33/22* (2013.01); *A63H 33/42* (2013.01); *A63J 19/00* (2013.01); *G03B 21/54* (2013.01); *G03B 21/58* (2013.01); *A63H 2200/00* (2013.01); *G03B 21/00* (2013.01)

(58) Field of Classification Search
CPC ........ G03B 21/10; G03B 21/54; G03B 21/58; A63F 13/213; A63F 13/25; A63H 3/52; A63H 33/22; A63H 33/42; A63J 19/00
See application file for complete search history.

(56) References Cited

U.S. PATENT DOCUMENTS

| 2009/0015799 A1* | 1/2009 | Luciano ................. G03B 21/10 353/79 |
| 2011/0019162 A1* | 1/2011 | Huebner .............. G03B 21/145 353/79 |

* cited by examiner

*Primary Examiner* — William H McCulloch, Jr.
*Assistant Examiner* — Yingchuan Zhang
(74) *Attorney, Agent, or Firm* — Leason Ellis LLP

(57) ABSTRACT

A portable system is provided for engaging users during play by presenting one or more images provided by a mobile computing device. The system includes a projector configured to visually output the one or more images delivered by the computing device. The system also includes a mount for supporting the projector, and at least one lens that is coupled to the projector. The system further includes a housing having at least a first and second illuminable surface that can receive images projected by the projector. The surfaces can be moved between a collapsed condition and an operative condition.

18 Claims, 6 Drawing Sheets

PORTABLE PLAY-SPACE FOR ENGAGING USERS

FIELD OF THE INVENTION

This patent application relates generally to the field of portable play-space systems, and more particularly to systems for engaging users during play by presenting one or more images provided by mobile computing devices.

BACKGROUND OF THE INVENTION

In today's increasingly mobile society, parents continue to look for ways keep their children engaged while traveling away from home. Parents now frequently turn to mobile devices (e.g., cell phone, tablet computer) as a way to entertain children at home and while traveling. The ability for children to quickly switch between different types of media on a mobile device—including games, education activities, television, and movies—allows for hours of enjoyment. However, doctors have suggested mobile devices should not completely displace traditional learning and playing activities for children. In fact, too much time watching mobiles device and/or tablet screens—similar to watching television—is known to cause sleep disruption in children. Too much screen-watching has also been associated with delayed language development for younger children. Additionally, a child's ability to develop his or her tactile skills using a mobile device or tablet is limited, as the child cannot interact with the objects on the screen in three dimensions like he or she would with traditional toys or objects. As such, a young child's tactile skill development could also be delayed if he or she spends too much time watching a screen, and not enough time interacting with real-world objects.

The use of traditional toys allows children to interact with the toys physically, use their imagination, and prevents them from spending too much time in front of a screen. However, due to the wide variety of entertainment now available on mobile devices, children are oftentimes quickly bored by traditional toys and opt to play with a mobile device instead. Thus, it can be appreciated that a portable play-space that allows for the incorporation of traditional toys and videos and/or images is desired in the art.

SUMMARY OF THE INVENTION

According to a first aspect, a portable system is provided for engaging users during play by presenting one or more images provided by a mobile computing device. The system includes a projector configured to visually output the one or more images delivered by the computing device. The system also includes a mount for supporting the projector, and at least one lens that is coupled to the projector. The system further includes a housing having at least a first and second illuminable surface that can receive images projected by the projector. The surfaces can be moved between a collapsed condition and an operative condition.

When the housing is in the operative condition the illuminable surfaces can be generally orthogonal to one another and the one or more images are projected onto the surfaces by the projector using the lens. In addition, when in the operative condition, the mount can position the projector relative to the first and second surfaces such that the one or more images are projected onto the first and second surfaces with no more than a first prescribed amount of distortion. Moreover, the lens can focus at least one image onto the first and second illuminable surfaces when the first and second surfaces are in the operative condition.

According to another aspect, the mount supported by the housing and supporting the projector and the lens cooperate to position the projector relative to the first and second surface such that the one or more images are projected onto the surfaces via the lens with no more than a prescribed amount of distortion. According to another aspect, the mount can also be configured to position the projector relative to the surfaces such that images are projected onto the surfaces via the lens with no more than a prescribed amount of interference.

These and other aspects, features, and advantages can be appreciated from the accompanying description of certain embodiments of the disclosure and the accompanying drawing figures and claims.

DESCRIPTION OF THE DRAWING FIGURES

DETAILED DESCRIPTION OF CERTAIN EMBODIMENTS

The following detailed description, which references to and incorporates the drawings, describes and illustrates one or more specific embodiments. These embodiments, offered not to limit but only to exemplify and teach what is described, are shown and described in sufficient detail to enable those skilled in the art to practice the invention. Thus, where appropriate, the description may omit certain information known to those of skill in the art.

By way of overview and introduction, herein is described a portable system for engaging users during play by presenting images to the user within a play-space. The images can be delivered by a mobile computing device, such as a smartphone or tablet device, coupled to a projector. The system includes a housing having multiple illuminable surfaces, and a mount that attaches to the housing and supports the projector while the system is in use. The projector is used to project the images (e.g., skins) that are provided by the mobile computing device onto the illuminable surfaces of the housing. The illuminable surfaces of the housing are arranged to provide an area for the user to play and present the images projected by the projector. The illuminable surfaces of the housing thereby serve as the background for the user's play-space.

Figure 3:
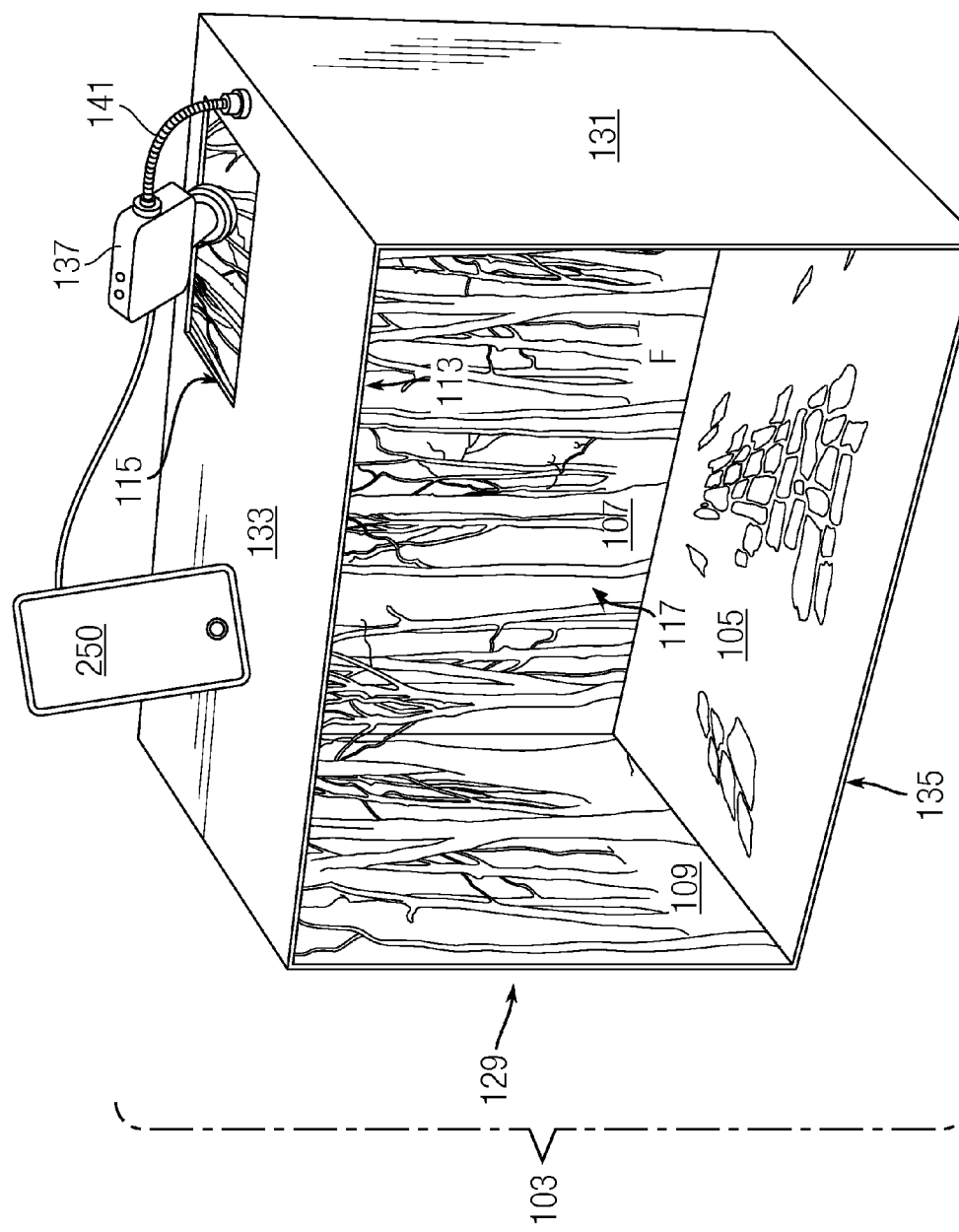
FIG. 3 is a side perspective illustration of the system for engaging users during play in the operative condition including an image displayed onto the first, second, and third surfaces with minimal distortion, according to at least one embodiment.

The one or more images visually displayed by the projector can include but are not limited to static images and/or dynamically changing images such as animations or videos that are part of an electronic media file which is provided by the computing device. For instance, as shown in FIG. 3, the projector can project the static image of a forest F onto the surfaces of the housing 103. This would allow the user to have the look and feel of a forest as the backdrop of his or her play-space thereby enhancing the user's experience. In addition or alternatively, as further described herein, the one or more images can include animations or videos that provide a changing landscape for the user while playing within the play-space, say, a storyboard from the user's favorite cartoon show or movie. It can also be appreciated that the computing device, which provides the image(s) to the projector for output, can also output a corresponding audio component thereby providing an audio-visual experience for the user. In some implementations, the scene provided by the computing device can change after a prescribed period of time and/or change the audio content played by the audio output device after a prescribed period of time. For example, the electronic media file can be configured such that the image and associated audio content changes to a different image with different audio content in one minute intervals. The number of different images or audio files and the intervals upon which they change can be individualized to fit the needs of the user.

According to a salient aspect, as further described herein, the housing is configured such that the housing can be transitioned between an operative condition and a collapsed condition. In the collapsed condition, the system is portable and can be easily transported and/or stored by the user in between uses.

According to another salient aspect, as further described herein, one or more of the various system components (e.g., the mount, projector and lenses) are configured and/or cooperate with one another to minimize the amount of image distortion when the images are projected on the illuminable surfaces of the housing. For example, the mount can be configured to position the projector relative to the first and second surfaces such that the image is projected onto the first and second surfaces by the lens with no more than a prescribed amount of distortion on respective surfaces. Similarly, one or more of the mount, projector and/or the lens can also be configured to minimize the amount of interference with the images (e.g., any shadowing of the projected image on the illuminable surfaces) while the user is playing within the play-space.

According to another salient aspect, in certain embodiments, user interactions with the computing device while accessing the play-space can be captured and used to augment the presentation of the images within the play-space, so as to provide an interactive and dynamically changing experience for the user. For example, the user can interact directly with the computing device and the interactions can cause the computing device to alter the scene being presented. In other implementations, the user's actions within the play-space can be detected by the computing device and the scene can be automatically changed based on those detected actions.

The Housing

Figure 1A:
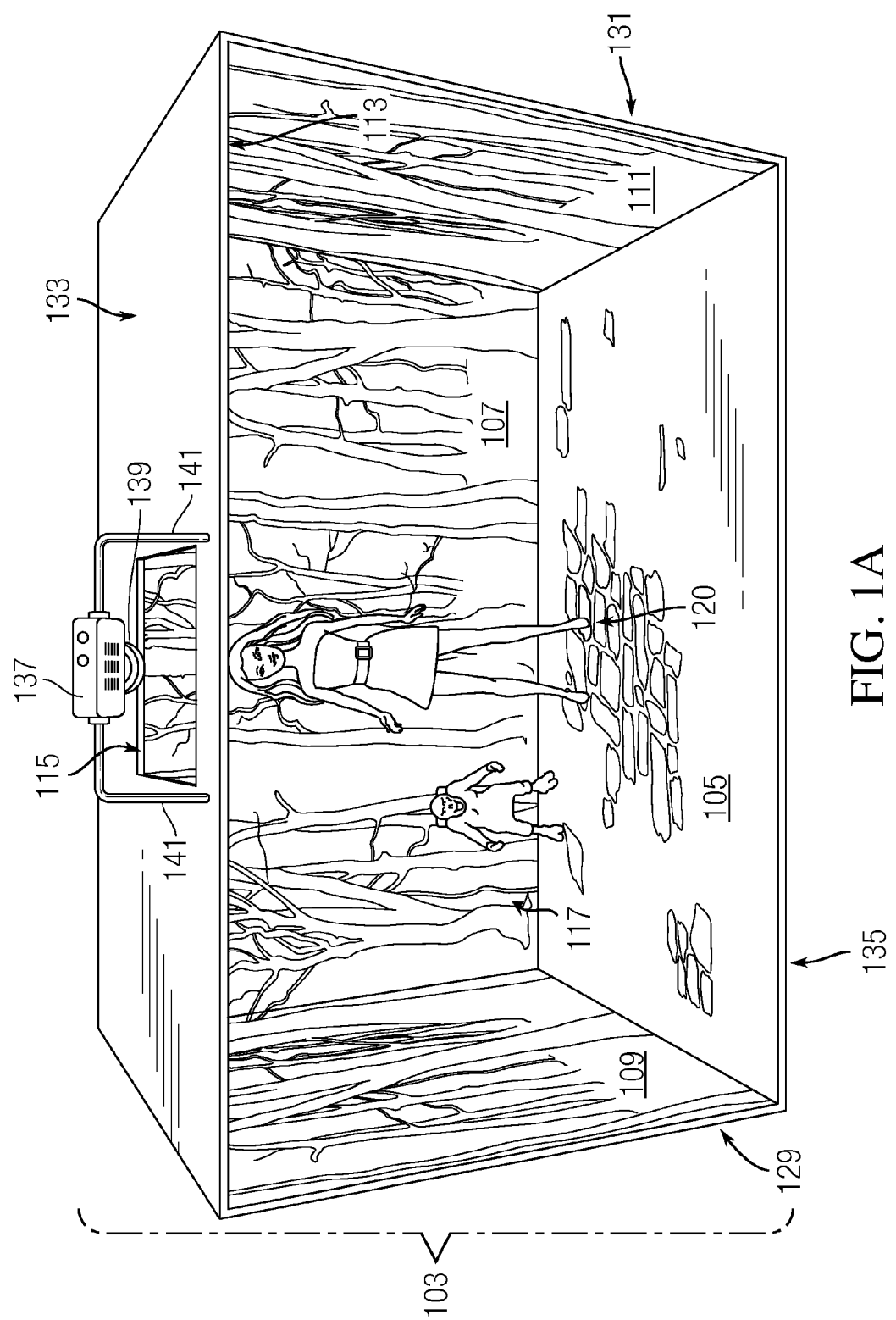
FIG. 1A is a front perspective illustration of a system for engaging users during play in an operative condition according to at least one embodiment.

FIG. 1A depicts an exemplary configuration of the system for engaging users during play 100. As shown in FIG. 1A, the housing 103 is in the operative condition and is shaped like a box. The housing has an open front side such that the user can access and use the interior 120 of the housing as a play-space (e.g., for playing with action figures, dolls, toys, and the like). The housing preferably has a size that is suitable for play with toys and action figures of various sizes, although smaller and larger housings are envisioned depending on the desired.

More specifically, the system for engaging users during play 100 shown in FIG. 1A includes a housing 103 having a plurality of walls with respective illuminable surfaces that are viewable from the interior 120 of the housing when in the operative condition. The illuminable surfaces include a first surface 105 (bottom wall 135), a second surface 107 (back wall 117), a third surface 109 (left side wall 129), a fourth surface 111 (right side wall 131), and a fifth surface 113 (top wall 133).

As shown, each surface intersects with three other surfaces and are generally orthogonal to one another such that the walls of respective surfaces define a box shaped housing 103 having an open front side so as to allow the user to access the interior 120 of the housing (the "play-space"). In alternative embodiments, in the operative condition, the surfaces can be positioned at angles other than 90 degrees relative to each other depending on the needs of the user. For example, the third surface 109 and the fourth surface 111 can be positioned to create an angle of greater than 90 degrees relative to the second surface 107, thereby creating a wider play-space on the interior of the housing and reducing the need to correct for disturbances on the third and fourth surfaces. Similarly, in some implementations, the fifth surface 113 can be positioned to create an angle of greater than 90 degrees relative to the second surface 107 (back wall 117), thereby increasing the height of the play-space.

Figure 1B:
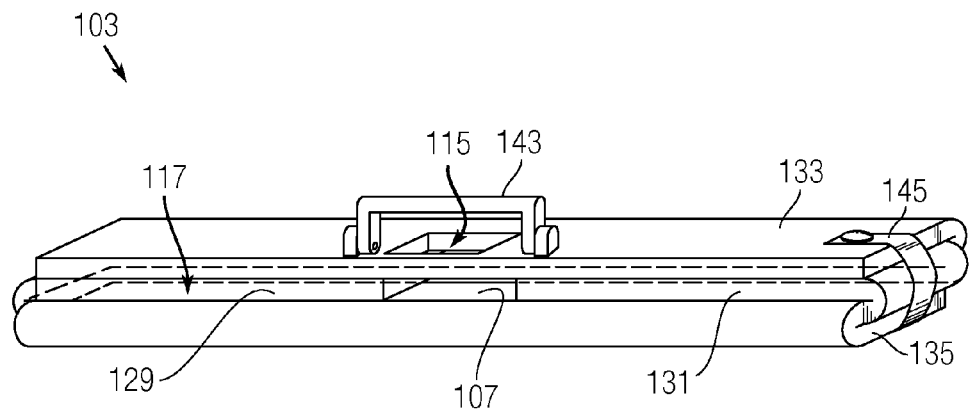
FIG. 1B is a front perspective illustration of a system for engaging users during play of FIG. 1 in a collapsed condition according to at least one embodiment.
Figure 1C:
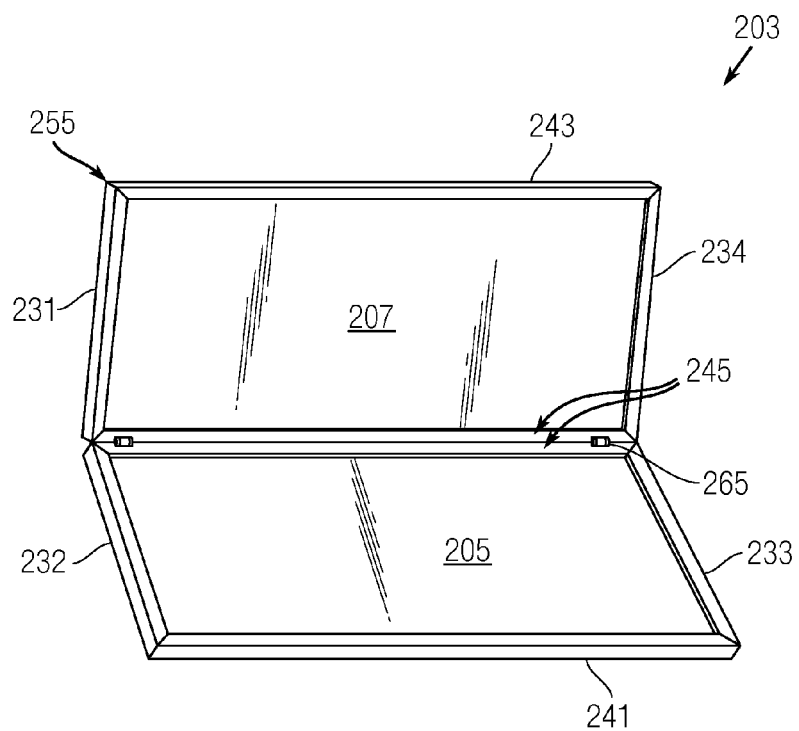
FIG. 1C is a front perspective illustration of an alternative configuration of a system for engaging users during play in an operative condition according to at least one embodiment.
Figure 2:
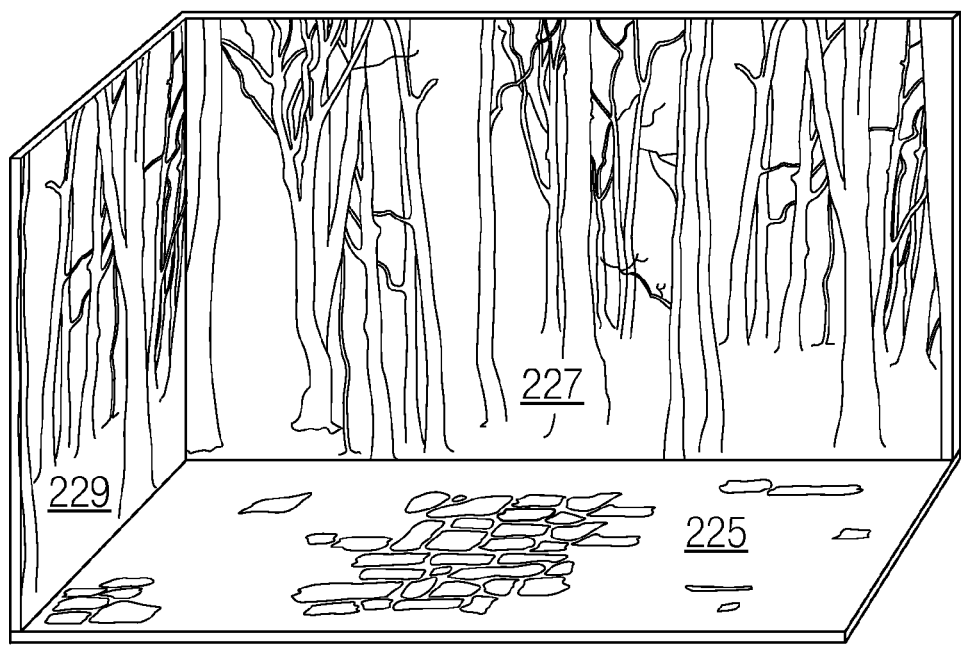
FIG. 2 is a front perspective illustration of an another alternative configuration of a system for engaging users during play in an operative condition according to at least one embodiment.

In alternative embodiments, the housing can have fewer than five illuminable surfaces and respective walls. For example, as shown in FIG. 1C, the housing 203 can include a bottom surface 205 and a back surface 207 that intersect to form an L shaped housing. By way of further example, as shown in FIG. 2, the housing can include a back surface 227 and a side surface 229 and a bottom surface 225 that intersect to form a three sided play-space. As would be understood by those in the art, the number of surfaces and relative position of the surfaces can vary depending on the needs of the user without departing from the scope of the invention. It should also be understood that, although the housing illustrated in FIG. 1A depicts surfaces that intersect with adjacent surfaces, configurations in which surfaces do not intersect are also possible.

As noted above, preferably, the housing is configured to be transitioned between a collapsed condition in which the system 100 is more easily transported or stored by the user, and an operative condition in which, 1) the play-space is accessible by the user, and 2) one or more images can be projected onto one or more of the illuminable surfaces.

In some implementations, the walls can be temporarily joined, permanently joined, or a combination of the foregoing, to the adjacent walls. Accordingly, when joined, the walls provide structural rigidity to the housing in the operative condition. It can be appreciated that walls configured to repeatedly detach and re-attach to one-another facilitates transitioning the housing 103 between the operative condition and the collapsed condition. In addition, the type of attachment between one or more adjacent walls can be flexible so as to facilitate transitioning the housing from the operative condition to the collapsed condition while remaining fixedly attached. The walls can be removably attached to one another in various ways known in the art, such as by hook and loop fasteners, push-button fasteners, clips, fasteners, slot and tab joints or other suitable temporary joining means. The walls can be fixedly attached to one another in various ways known in the art, such as by stitching, heat welding, glue or other adhesive, rivets, screws, fasteners, slot and tab joints or other suitable temporary or permanent joining means.

In some implementation, the back wall 117, can be fixedly and flexibly joined to the adjacent walls (e.g., side walls 131 and 129, bottom wall 135, and top wall 133), and the side walls, the bottom wall and the top wall can be temporarily joined to all other adjacent walls. Accordingly, the sides, bottom and top can be detached from any adjacent walls (other than the bottom wall) and can be folded onto the bottom wall into the collapsed condition. FIG. 1B depicts the exemplary housing 103 of FIG. 1A in a collapsed condition.

As shown in FIG. 1B, the housing 103 can also include a handle 143 to facilitate the carrying of the housing 103 by a user when the housing is in the collapsed condition. The handle 143 can be located on the outside of the housing 103, preferably, on the outside of one of the walls. When the surfaces are in the collapsed condition, a user can use the handle 143 to carry the system 100 to a different location. In some implementations, the housing 103 can include multiple handles on the outside panel(s) of the surface(s) of the housing 103.

Further, the system 100 can also include a strap 145 for holding the surfaces together when the surfaces are in the collapsed condition. In at least one embodiment, one end of the strap can be permanently attached to an outside surface of one of the walls, and the other end of the strap can be selectively attachable to an outside surface of another wall such that one end of all the surfaces of the housing 103 can be held in place by the strap 145. Thus, the strap 145 prevents the surfaces from unfolding from the collapsed condition, allowing the user to carry the housing 103 to a different location more easily. For example, as shown in FIG. 1B, when the surfaces are in the collapsed condition, the left side wall 129, right side wall 131, and back wall 117 are sandwiched between the top wall 133 and the bottom wall 135. As such, the strap 145 can be permanently attached on one end to the bottom wall 135 and can be removably attached to the outside of the second top surface, effectively holding all of the walls together in the collapsed condition such that they do not become unfolded during transport. The selectively attachable end of the strap 145 can attach to the outside of another surface of the housing 103 in various ways know in the art, such as by hook and loop fasteners, push-button fasteners, and the like. The housing 103 can also include a storage compartment or pouch for securing and protecting the projector and/or the mount during transport in the collapsed condition (not shown).

Turning briefly to FIG. 1C, FIG. 1C depicts an alternative configuration of a housing 203 in the operative condition. As shown, the housing can include first and second illuminable surfaces 205 and 207, respectively that can be comprised of a flexible material that is attached to an exterior frame work 255 at one or more locations. For example, the first surface 205 can be attached to a central arm 245 and a front arm 241 of the framework 255. Similarly, the second surface 207 can be attached to the central arm 245 and a top arm 243. In the operative condition, top arm 243 and central arm 245 are also attached to side arms 231 and 234 and the front arm 241 and central arm 245 are attached to side arms 232 and 233. Accordingly, as shown, the assembled framework 255 provides a housing in which the first surface 205 and the second surfaces 207 are orthogonal relative to one another.

In addition, the housing can be configured to transition from the operative condition to a collapsed condition by disassembling one or more pieces of the framework 255 and rolling the flexible first and second surfaces 205 and 207 into a collapsed condition. For example, side arms 231-234 can be detached from one or more of the arms 241, 243 and/or 245, such that the first and second surfaces 205 and 207 can be rolled onto each other into a collapsed condition. Alternative collapsible housing configurations would be understood by those in the art. For instance, as also shown in FIG. 1C, central arm 245 can consist of two arms attached together using a hinge 265 thereby providing a foldable housing 203.

The Projector and Mount

Returning to FIG. 1A, the system for engaging users during play 100 includes a projector 137 configured to visually output images provided by the computing device 250 onto illuminable surfaces of the housing 103 when in the operative condition, though the projector can be provided separate from the housing. For example, as shown in FIG. 3, the projector 137 projects the image of a forest F onto one or more illuminable surfaces of the housing 103.

Figure 5:
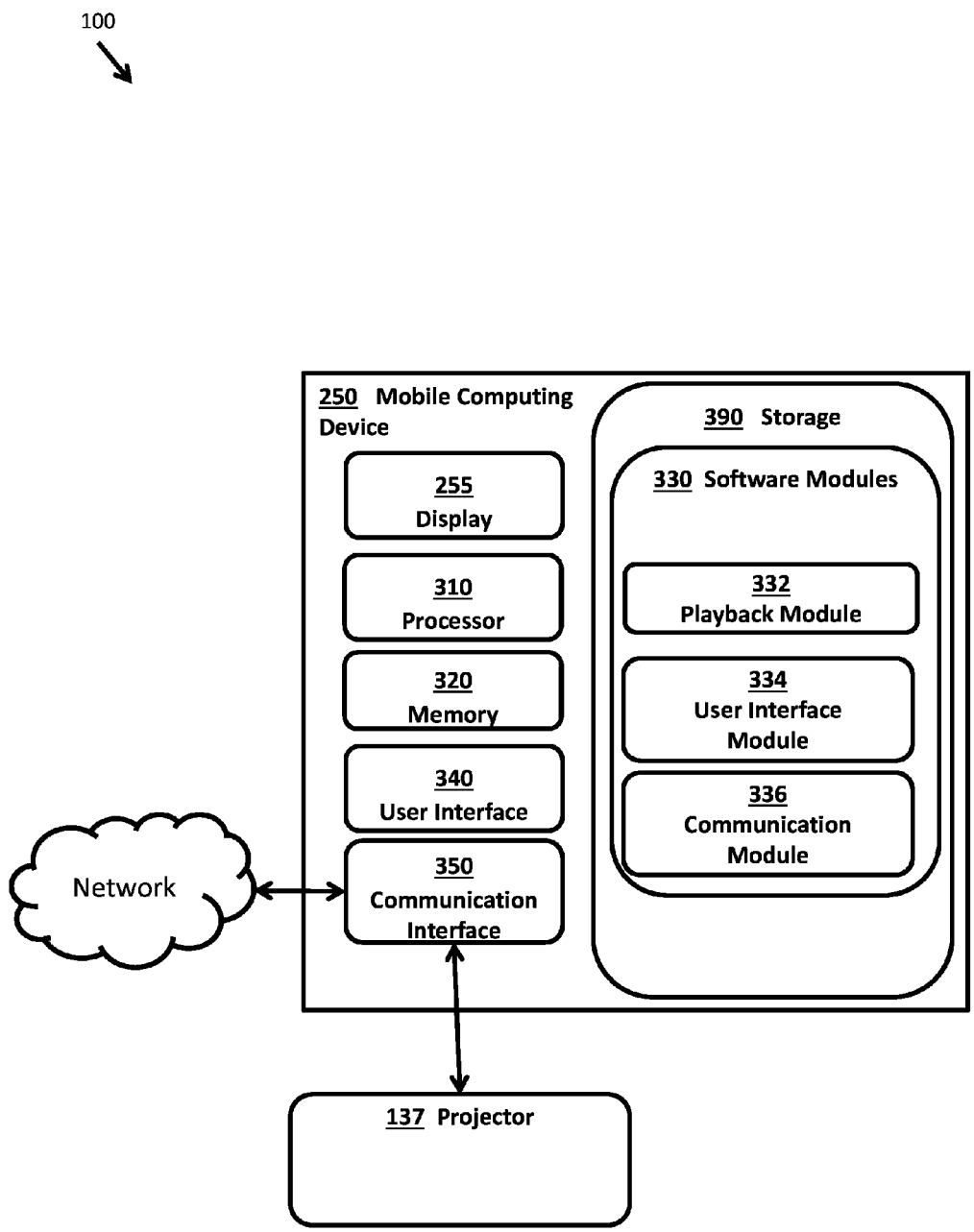
FIG. 5 is high-level diagram illustrating an exemplary configuration of a computing device for use with the system for engaging users during play.

In one or more implementations, the projector 137 is a separate device communicatively coupled to the computing device 250 (not shown in FIG. 1A; see FIG. 5). The projector 137 can be a pico projector device coupled to the computing device 250 using a wired or wireless connection. For example, FIG. 3 shows the projector 137 connected to the computing device 250 via a wired connection. In an alternative embodiment, the display screen of the computing device 250 itself (e.g., the display of a smartphone or tablet computer) can be configured to act as the projector 137.

In one or more embodiments, a mount 141 can be used to support and position the projector 137 such that the projector is stably mounted relative to the illuminable surfaces so as to output the one or more images onto one or more of the illuminable surfaces of the housing 103 when in the operative condition. In some implementations, the mount is supported by at least one wall of the housing 103. The mount can be attached in any number of ways known in the art, for example, using a clamp. In one or more implementations, the mount 141 is detachable so that it can be easily moved to various locations on or within the housing 103. Additionally, the mount 141 can be horizontally and/or vertically adjustable after attachment to the housing 103 such that the positioning of the projector 137 (e.g., location and/or angle of the projector 137) can be changed relative to the illuminable surfaces. For example, the mount can include an articulating neck (as shown in FIG. 3) that supports the projector and allows the projector to be moved in multiple directions and rotated.

The mount 141 can position the projector 137 within the interior region of the housing, on the exterior of the housing, or a combination of the foregoing, namely, partially within the interior region while protruding exteriorly. As shown in FIG. 1A, the mount 141 is attached to the top wall 133 of the housing 103. In the exemplary embodiment described in FIG. 1A, the top wall 133 and the fifth surface 113 can include an aperture 115 such that the projector 137 mounted on the exterior of the top wall 133 can project the image through the aperture 115. As shown, projector 137 can display the one or more images through the aperture 115 and onto the first, second, third, and/or fourth surface (105, 107, 109, 111) when the surfaces are in the operative condition.

The aperture 115 can be sized and shaped to fit the needs of the user. For example, the aperture 115 can be in the shape of a rectangle as shown in FIG. 1. Alternatively, the aperture 115 can be shaped and sized to specifically fit a particular projector. The aperture 115 can also be located at any location on the fifth surface 113. For instance, the aperture 115 can be centered on the fifth surface 113 such that the projector 137 can project one or more images on to the center of at least the first and/or second surfaces (105 and 107) as shown in FIG. 1. Alternatively, the aperture 115 can be located near the third surface 109 such that the projector 137 can more easily project image(s) onto the fourth surface 111 or vice versa. For example, FIG. 3 shows an alternative placement of the aperture and the mount.

Figure 4:
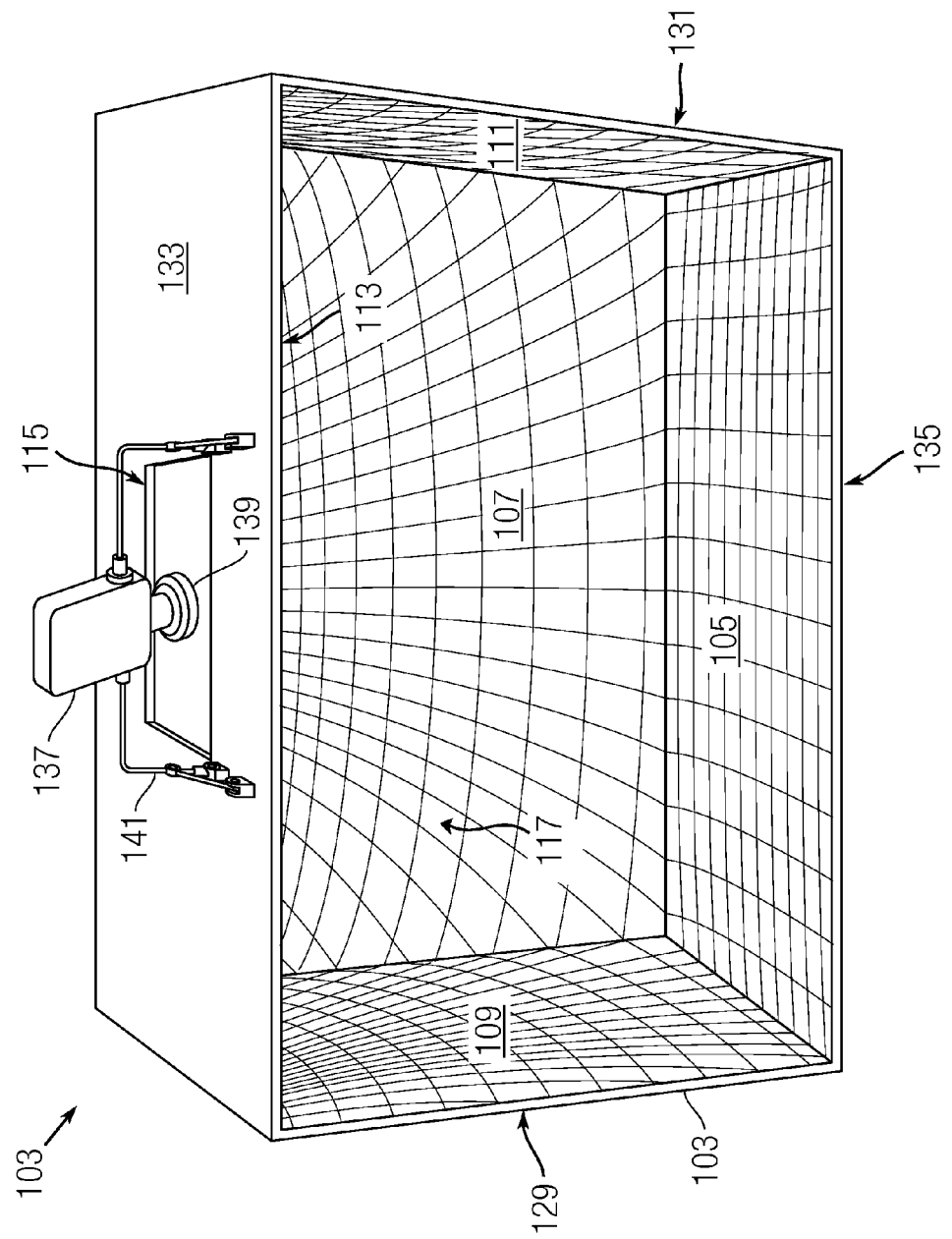
FIG. 4 is a front perspective illustration of the system for engaging users during play in the operative condition including an image displayed on first and second surfaces, according to at least one embodiment.

In one or more implementations, the mount 141 can be attached to the housing such that the images outputted onto one or more of the surfaces by the projector and lens combination have no more than a first prescribed amount of distortion. FIG. 4 depicts the housing of FIG. 1A, and the projector 137 projecting an image of a grid onto the illuminable surfaces of the housing. If the grid image was projected directly at a flat wall that is perpendicular to the projector, the displayed grid image would have intersecting grid-lines that form right angles to one another with effectively no distortion. The grid displayed on the illuminable surfaces in FIG. 4 which includes curved lines having varying radii, demonstrates characteristic image distortion that results from the particular positioning of the projector relative to the illuminable surfaces. In accordance with the disclosed embodiments, the mount 141 is configured to position the projector 137 in a manner that limits the amount of distortion of the image on at least two of the illuminable surfaces (e.g., back surface 107 and bottom surface 105) to prescribed amount of distortion. As a result, the image projected as a backdrop has minimal distortion so as to provide a more realistic experience to the user playing within the play-space.

Additionally, in an implementation that includes at least a first, second, third, and fourth surface (e.g., bottom surface 105, back surface 107, and side surfaces 109, 111), the mount 141 can be positioned on the housing such that the image(s) outputted onto the side surfaces (i.e., third surface 109 and/or fourth surface 111) have no more than a second prescribed amount of distortion (see FIG. 4).

Similarly, in at least one embodiment, the mount 141 can be configured to position the projector 137 relative to the surface(s) of the housing such that the image(s) displayed onto the surface(s) has no more than a prescribed amount of interference (or "shadow effect"). Shadow effect occurs when a user is playing within the play-space, for example, using an action figure and the figure or the user's hands or arms blocks a portion of the image being projected onto one or more of the illuminable surfaces. Accordingly, the mount 141 can be positioned and configured to orients the projector 137 relative to the one or more illuminable surfaces to minimize the amount of shadowing effect that occurs when a user is playing within the play-space.

The projector 137 can also include or be coupled to at least one lens 139. As would be understood by those in the art, the one or more lens 139 can be used to focus the image(s) output by the projector 137 onto the illuminable surface(s) of the housing 103 when the surface(s) are in the operative condition. Furthermore, the one or more lens 139 can be shaped in a way that limits the distortion of the image on one or more of the surface(s) of the housing 103. For instance, the radius of curvature of the lens can be defined, based on the intended position of the lens relative to the first surface 105 and the second surface 107 (e.g., back and bottom surfaces) once the projector is seated in the mount, to project the portion of the image on the respective surfaces with optimal distortion characteristics (i.e., minimal distortion).

By way of further example and without limitation, the lens can have portions with respective radii of curvature that are defined, based on the position of the lens relative to a respective surface that the particular portion of the lens is designed to project the image onto, so as to project a portion of the image on the respective surfaces with less distortion than an image projected with a conventional lens having a single radius of curvature.

In addition or alternatively, the system can include a plurality of lenses such that each is configured to focus at least a portion of the one or more images on one or more of the respective surface when in the operative condition. For example, a multi-lens system can project the image onto the one or more illuminable surfaces from different angles so as to minimize for distortion or shadowing effect.

The Computing Device

FIG. 5 is a high-level diagram illustrating an exemplary configuration of a computing device 250 for use in conjunction with the system for engaging users during play 100. The computing device can be a personal computing device of a user, a laptop computer, or a mobile device/smartphone, though it should be understood that computing device 250 can be practically any computing device and/or data processing apparatus capable of embodying the systems and/or methods described herein. In one arrangement, computing device includes a processor 310 that serves to execute instructions to perform various operations relating to the system for engaging users during play 100. The computing device also includes persistent storage 390 and/or memory 320 to store electronic media files, which include the one or more digital image(s) and/or associated audio files. Computing device 250 can also be configured to communicate the electronic media files to the projector 137 for presentation and can also receive information from one or more remote computing devices using the communication interface 350. Computing device 250 can also be configured to collect (and/or display) inputs from one or more users via a user interface device 340, such as a keypad or touch-screen input as would be understood by those skilled in the art.

In certain implementations, the memory 320 and/or a storage medium 390 can include one or more software modules 330 that comprise one or more software programs or applications having computer program code or a set of instructions executed in the processor 310. Such computer program code or instructions for carrying out operations for aspects of the systems and methods disclosed herein. The program code can execute entirely on the computing device 250 as a stand-alone software package, partly on the computing device 250 and partly on a remote computing device, such as the projector 137, or entirely on such remote devices. In the latter scenario, the remote device can be connected to the computing device 250 through any type of wired or wireless connection or network, including a local area network (LAN) or a wide area network (WAN), or the connection can be made to an external computer (for example, through the Internet using an Internet Service Provider).

Preferably, included among the software modules 330 are a playback module 332, a user interface module 334, and a communication module 336 that are executed by the processor 310. More specifically, during execution of the playback module 332, the processor is configured to select and provide one or more components of a stored electronic media file to the user via an associated output devices including the projector 137 and/or an audio output (not shown). During execution of the user interface module 334, the processor is configured to receive user inputs via the user interface 340, interpret the user input and adjust playback of the electronic media file(s) accordingly. During execution of the communication module 336, the processor is configured to communicate with appropriate peripheral devices (e.g., the projector 137).

As noted above, the electronic media file can include one or more digital images for display by the projector 137, including but not limited to, static images and/or dynamically changing images such as animations or videos. For instance, as shown in FIG. 3, the projector can project the static image of the forest F onto the surfaces of the housing 103. In addition or alternatively, the one or more images can include animations or videos that provide a intermittently or constantly changing landscape for the user while playing within the play-space, say, a storyboard from the user's favorite cartoon show or movie. It can also be appreciated that the computing device 250, which provides the image(s) to the projector 137 for output, can also output a corresponding audio component thereby providing an audio-visual experience for the user.

In some implementations, the scene provided by the computing device can change after a prescribed period of time and/or change the audio content played by the audio output device after a prescribed period of time. For example, the electronic media file can be configured such that the image and associated audio content changes to a different image with different audio content in one minute intervals. The number of different images or audio files and the intervals upon which they change can be individualized to fit the needs of the user.

In at least one implementation, the computing device can include an associated input device 340, which allows the user to select or change the image/video content being displayed on the surface(s) of the housing. More specifically, the processor 121 of the computing device 250, which is configured by executing one or more software modules 330, including, preferably, the user interface module 334 and the playback module 332, can receive user inputs via the input device 340. Based on the user inputs, the configured processor can select one or more electronic media files, or components of a particular electronic media file, to be output to the user via the projector 137 and/or the audio output device.

In some implementations, the user can select a particular scene for display via the projector 137. In some implementations, based on the user input, the configured processor can dynamically augment the displayed scene by presenting additional visual elements on the illuminable surfaces or cause another audio file to be played, or a combination of the foregoing. For example, the user tapping the user interface 340 can cause a new character to appear within the scene, or can cause a noise to be output or a combination of the foregoing. In this manner a user input can create a dynamically changing and interactive scene for the user to experience.

User interface 340 can be configured to receive active inputs, for instance, direct taps to the smartphone screen. In addition or alternatively, user inputs can be received passively through passive input devices such as motion detectors. For instance, user interface 340 can include a motion detector that is mounted to the housing (e.g., 103) and is configured to detect user hand position, orientation, gestures and the like within the play-space. Upon a user moving their hand, or an action figure to the edge of the play-space (e.g., towards left-side illuminable surface 109) the received hand-position can cause the configured processor to advance the scene as if the user was walking in the direction of the left side of the scene. Alternative methods of interpreting user actions within the play-space and augmenting the user experience through visual and audio adaptations to the scene being provided to the user would be understood by those skilled in the art.

The electronic media files and/or the computing device 250 can also be configured to minimize the amount of distortion of the images that are projected on the illuminable surface(s) of the housing. Specifically, in one or more embodiments, the electronic media file which is configured by executing one or more of the software modules 330 including, preferably, the playback module 332, can cause the processor 310 to output the one or more images in a manner than reduces the amount of distortion on one or more of the surfaces. For example, the configured processor can dynamically adjust the digital images provided to the projector 137 to compensate for distortion such that the images are projected onto the one or more illuminable surfaces with minimal distortion. In an alternative implementation, the electronic media file itself can include pre-adjusted images to compensate for the distortion that would typically occur when projecting a standard image onto the one or more surfaces. In this last alternative implementation, the electronic media files are matched to the housing and mount to cause a minimally distorted image to be projected by the projector onto the illuminable surfaces, and differ from a source image or video in that the so-matched media file has an embedded distortion which renders the image unsuitable for viewing on surfaces other than the illuminable surfaces.

It is to be understood that like numerals in the drawings represent like elements through the several figures, and that not all components and/or steps described and illustrated with reference to the figures are required for all embodiments or arrangements. It should also be understood that certain embodiments, implementations, and/or arrangements of the systems disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present disclosure need not reside on a single computer or processor, but can be distributed in a modular fashion amongst a number of different computers or processors to implement various aspects of the systems disclosed herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A portable system for engaging users during play by presenting one or more images that are delivered by a mobile computing device having a processor, a non-transitory computer readable storage medium and a software application including instructions stored on the storage medium and executable in the processor, the system comprising:
    a projector configured to visually output the one or more images delivered by the processor;
    a mount supporting the projector;
    at least one lens coupled to the projector; and
    a housing including at least first, second, third, and fourth illuminable surfaces that are configured to receive images projected by the projector,
    wherein the illuminable surfaces are configured to be moved between a collapsed condition and an operative condition such that, when in the operative condition, the one or more images are projected onto the surfaces by the projector using the lens, and wherein the first and second surfaces are orthogonal to one another and the third and fourth surfaces are orthogonal to the first and second surfaces when in the operative condition, and wherein the second, third, and fourth surfaces are foldable onto the first surface in the collapsed condition,
    wherein the mount is supported by the housing and, when in the operative condition, is configured to position the projector relative to the first and second surfaces such that the one or more images are projected onto the first and second surfaces with no more than a first prescribed amount of distortion,
    wherein the mount, when in the operative condition, is configured to position the projector relative to the surfaces such that the one or more images are projected onto the first, second, third and fourth surfaces with no more than a prescribed amount of interference (shadow effect), and
    wherein the lens is configured to focus at least one image on the illuminable surfaces when the surfaces are in the operative condition.

2. The system of claim 1, wherein, when in the operative condition, the one or more images are projected onto one or more of the third or fourth surfaces with no more than a second prescribed amount of distortion.

3. The system of claim 1, wherein, when in the operative condition, the first and second surfaces define a bottom and back side of the housing respectively and the third and fourth surfaces define respective left and right sides of the housing, and wherein the first, second, third and fourth surfaces of the housing define an interior region of the housing that is accessible by the user from an open front of the housing.

4. The system of claim 3, further comprising a fifth surface of the housing, wherein the fifth surface defines a top side of the housing and wherein the fifth surface is orthogonal to the second, third and fourth surfaces when in the operative condition.

5. The system of claim 4, wherein the fifth surface is formed to define an aperture in the top side of the housing, and wherein the mount is supported by the housing such that the one or more images are output by the projector onto the first, second, third, and fourth surfaces through the aperture.

6. The system of claim 1, wherein, when in the operative condition, the mount is configured to position the projector at a particular location and at a particular angle relative to the surfaces, respectively.

7. The system of claim 1, further comprising a plurality of lenses that are each configured to focus at least a portion of the one or more images on a respective surface when in the operative condition.

8. The system of claim 1, further comprising:
    an electronic media file, wherein the one or more images are included in the electronic media file; and
    a software application executed by the processor of the mobile computing device, wherein the software application playing the electronic media file configures the processor using the projector to output the one or more images in a manner that reduces the amount of distortion on the first, second, third, and fourth surfaces.

9. The system of claim 8, wherein the electronic media file includes the one or more images and audio content that is playable using an associated audio output device of the computing device.

10. The system of claim 8, wherein the processor executing the software application is configured to receive inputs from a user using an associated input device and wherein the processor is configured to deliver one or more new images included with the electronic media file according to the user input.

11. The system of claim 8, wherein the one or more images are pre-distorted using the processor to match the dimensions and configuration of the first, second, third, and fourth illuminable surfaces, whereby the processor using the projector projects the one or more images on the illuminable surfaces with minimal distortion.

12. The system of claim 1, wherein the mount is configured to adjustably position the projector relative to the surfaces when in the operative condition.

13. The system of claim 1, wherein the projector is a display of the mobile computing device.

14. The system of claim 1, wherein the projector is a pico projector device communicatively coupled to the mobile computing device.

15. The system of claim 1, wherein the housing includes a handle coupled to an outer panel of a surface of the housing to facilitate the carrying of the system.

16. The system of claim 15, wherein the handle is coupled to the outer panel of the first surface.

17. The system of claim 1, wherein the one or more images are configured to be projected onto the entire first, second, third and fourth surfaces with no more than a prescribed amount of interference (shadow effect).

18. A portable system for engaging users during play by presenting one or more images that are delivered by a mobile computing device having a processor, a non-transitory computer readable storage medium, the system comprising:
    a housing including at least first, second, third, and fourth illuminable surfaces that are configured to display images projected by a projector, wherein the illuminable surfaces are configured to be moved between a collapsed condition and an operative condition such that, when in the operative condition, the one or more images are projected onto the surfaces by the projector, and wherein the first and second surfaces are orthogonal to one another and the third and fourth surfaces are orthogonal to the first and second surfaces when in the operative condition, and wherein the second, third, and fourth surfaces are foldable onto the first surface in the collapsed condition;

the projector including at least one lens, wherein the projector is operatively connected to the mobile computing device and configured to visually output the one or more images received from the processor, wherein the at least one lens is configured to focus the one or more images on the illuminable surfaces when the surfaces are in the operative condition;

an audio output device operatively connected to the computing device;

a mount supported by the housing and that is supporting the projector, wherein, when in the operative condition, the mount is configured to position the projector relative to the surfaces such that the one or more images are projected onto the surfaces with no more than a prescribed amount of interference;

an electronic media file comprising the one or more images and audio content that is playable using the audio output device; and a software application for execution by the mobile computing device and stored on the storage medium, the software application comprising instructions that are executable in the processor including:

a playback module that configures the processor to select and output one or more images of the electronic media file using the projector and audio content using the audio output device, and configures the processor to pre-distort the one or more images to match the dimensions and configuration of the first, second, third, and fourth illuminable surfaces, whereby the one or more images are projected onto the illuminable surfaces with minimal distortion, a user interface module that configures the processor to receive and interpret user inputs from a user using an associated input device and wherein the processor is further configured to deliver one or more new images included in the electronic media file according to the user input; and a communication module that configures the processor to communicate with the projector.

* * * * *